United States Patent Office 3,753,931
Patented Aug. 21, 1973

3,753,931
POLYETHER AMINES, THEIR PRODUCTION AND USE
Giuseppe Raspanti, Neuallschwil, Basel-Land, Switzerland, assignor to Sandoz Ltd., Basel, Switzerland
No Drawing. Filed May 28, 1971, Ser. No. 148,148
Claims priority, application Switzerland, June 5, 1970, 8,456/70
Int. Cl. C08j 1/46
U.S. Cl. 260—2 BP                                19 Claims

ABSTRACT OF THE DISCLOSURE

This invention is directed to new, water soluble, high molecular polyetheramines and their salts, produced by the reaction, in excess, of aliphatic polyamines which contain at least one primary or two secondary amino groups, may contain hydroxyl groups and have molecular weights not greater than 200, with polyepihalogenohydrins which contain 3 to 25 halogenomethyl groups, followed by removal of the excess polyamine from the reaction mixture by distillation, reaction of the resulting polyetheramine aqueous solution with crosslinking agents to a degree of crosslinking at which a viscosity increase occurs and the reaction mixture remains water soluble, and if desired partial or complete conversion of the free amino groups into their salts by the addition of acids. These new polyamines are useful as flocculating and flotation agents and as drainage and retention aids, especially in paper manufacture.

This invention relates to a process for the production of water soluble, high molecular polyether amines and their salts. The process consists in reacting aliphatic polyamines in excess with polyepihalogenohydrins, of which the polyamines bear at least one primary or two secondary amino groups, may bear hydroxyl groups and have molecular weights of maximum 200 and the polyepihalogenohydrins bear 3 to 25 halogenomethyl groups, followed by removal of the excess polyamine from the reaction mixture by distillation and reaction of the resulting polyether amine in aqueous solution with crosslinking agents to a degree at which a viscosity increase occurs while the reaction mixture remains water soluble, after which the free amino groups may be converted wholly or partially into their salts by the addition of acid.

The polyamines suitable for use in this process include 1,2-diaminoethane, 1,2-diaminopropane, 1,2-diaminobutane, 1,3-diaminopropane, 1,4-diaminobutane, 1,6-diaminohexane, N-(2'-hydroxyethyl)-1,2-diaminoethane, 1,3-diamino-2-propanol, 3-dimethylaminopropyllamine, N,N'-bis-(2''-hydroxyethyl)-1,2-diaminoethane, piperazine, N-(2-aminoethyl)-piperazine, diethylenetriamine, triethylenetetramine, tetraethylenepentamine, N,N-bis-(3-aminopropyl)-amine, N,N'-bis-2''-aminoethyl-1,4-diaminobutane and tri-(3-aminopropyl)-amine. These aliphatic polyamines consist of amino groups which are bound to each other through alkylene radicals and may be substituted by alkyl or hydroxyalkyl radicals; the number of substituents on the N atoms is kept small enough for the polyamine to contain at least one primary or two secondary amino groups. The polyamine of lowest molecular weight conforming to this definition is 1,2-diaminoethane. The molecular weight of the polyamines used in the process should not be higher than approximately 200 so that the excess, unreacted amine can be removed from the reaction mixture by distillation at temperatures at which the reaction product is stable.

The polyepihalogenohydrins used as starting materials in this process are known compounds or can be produced in analogy with commonly known methods. Their main component is a polyether chain which can be characterized by the following general formula

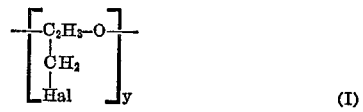

where Hal represents medium halogen, i.e. chlorine or bromine, and $y$ a number from 3 to 25. In the production of polyepihalogenohydrins, mixtures of products polymerized to different degrees are obtained; accordingly $y$ or the molecular weight defined by $y$ is an average value or an average molecular weight in the meaning of this invention.

On the basis of the terminal groups which are linked to the beginning and end of the polymer chain of the general Formula I, the polyepihalogenohydrins used in this process can be divided into the following groups:

(1) Polyepihalogenohydrins of formula

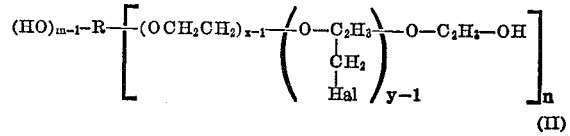

where R stands for hydrogen if $m$ and $x$ represent the number 1 or otherwise for an alkyl radical having not come than 6 carbon atoms, Hal for chlorine or bromine, $m$ and $n$ independently of each other for a whole number from 1 to 6, $x$ for a whole number from 1 to 20 and $y$ for a whole number from 1 to 25, the sum of $m$ and $n$ being at least 2 but not more than 7 and the product of $n$ multiplied by $y$ at least 3 but not more than 25. Polyepihalogenohydrins of this formula are obtained by using water, alcohols having 1–6 carbon atoms and 1–6 hydroxyl groups or alcohol ethers formed by the addition of ethylene oxide on these alcohols as "starters" for the polymerization of epihalogenohydrin;

(2) Polyepihalogenohydrins formed by converting some or all of the halogenohydrin end-groups in Formula II into the corresponding epoxide groups;

(3) Epihalogenohydrin polymers formed by acid catalysis without the use of "starters"; the exact constitution of the end-groups in these is not known;

(4) Epihalogenohydrin polymers formed with other than acid catalysts, provided their molecular weight is not too high, i.e. $y$ in Formula I may not be greater than 25. Catalysts of this type are described in U.S. Pat. 3,058,923.

Polyepihalogenohydrins of the above four groups are accessible by known methods; the relevant literature includes:

British Pats. 477,843 and 898,306
U.S. Pats. 2,483,749; 2,856,370; 2,599,799; 2,871,219; 2,891,073; 3,058,921; 3,158,580 and 3,305,565
J. Polymer Science 40, 571 (1959); 47, 486 (1960)
Bull. Chem. Soc. Japan 33, 727 (1960)
J. Appl. Polymer Science 6, 643 (1962)

Chem. Ab. 59, 2859 h (1963); 60, 12111c (1964); 60, 12113d (1964); 65, 1290c (1966).

In the first stage of the present process the aforenamed polyamines are alkylated on the N atoms by the halogenomethyl radicals of Formula I. It is mainly the primary and secondary amino groups in the polyamines that react. Alkylation of tertiary amino groups to quaternary ammonium ions takes place only to a limited extent. Since compounds having polymer chains of the type shown in Formula I bear a considerable number of halogenomethyl radicals, they can be termed polyalkylating agents. In their reaction with polyamines a very complex mixture of products is formed which cannot be characterized by a general formula. If, for instance, a proportion of the halogenomethyl groups reacts with the starting polyamines, new polyamines are formed which react again with the available halogenomethyl groups, to some extent as competitors of the starting amines. Thus polymer chains of Formula I are bound to each other by the exchange of Hal for polyalkyl amine radicals, which gives rise to crosslinked polyamines. If this crosslinking exceeds a certain limit, water insoluble products are formed which are outside the scope of the present invention. Since the polyalkylating agents and polyamines reacted in the process of this invention are multivalent, there is a wide range of possible crosslinking reactions, and at first it was not foreseeable whether, given almost quantitative reaction of the halogenomethyl radicals, water soluble polymers would result. The reaction most similar to that in the first stage of this process is the one described in U.S. Pat. 3,251,852. In this, polyepichlorohydrins with the molecular weights 450,900 and 1150 and polyamines, for example triethylene tetramine, are reacted at 20-30° C. for a considerable length of time, invariably in the presense of methanol and potassium hydroxide. Subsequently the temperature is slowly increased to 80-140° C. and the reaction continued to the end-point, which again takes a long time. This reaction has been carried out as specified in the patent, with results showing that by far the greater part of the chloromethyl groups do not react with the polyamine but with the potassium methylate, with exchange of chlorine for the methoxy radical. Consequently only a small number of the chloromethyl groups initially present in the reaction mixture is available as alkylating groups for the reaction with the polyamine at 80-140° C. Hence the conditions for crosslinking are very unfavourable, and the polymers formed have a great number of ether groups but only a few amino groups. This reaction can likewise result in too highly crosslinked, water insoluble products. To prevent this it is always carried out in the presence of solvent in an amount at least equal to that of the two reactants together.

In contrast to this process, the first stage of the present process is carried out without potassium hydroxide or other acid-binding agent and without solvent. Surprisingly, crosslinking giving insoluble reaction products is prevented solely by the use of excess polyamine. The excess amount of the starting amine necessary to prevent the formation of too highly crosslinked and hence insoluble reaction products depends on the degree of polymerization of the polyepihalogenohydrin for reaction. If the latter is high molecular (with many halogenomethyl groups) a greater excess must be employed than for polyepihalogenohydrins of lower molecular weight (few halogenomethyl groups). A considerable excess of starting polyamine is necessary: at least 2-3 mols to every one halogenomethyl group in the polyepihalogenohydrin must be used. It is not necessary to use solvents because the reactants are normally miscible in each other or sufficiently soluble in each other. From about 90-100° C. the reaction is strongly exothermic, so in plant production it is advisable to set the polyamine for reaction at this temperature and to add the polyepihalogenohydrin slowly so that the temperature does not increase too rapidly.

Temperatures higher than 200° C. should be avoided to guard against side-reactions and decomposition products. It is best for practically all the halogenomethyl groups to enter into reaction; this point is reached when the halogen ion content indicated in the reaction mixture comes close to the theoretical amount.

After the reaction the excess starting amine is eliminated by distillation, preferably with vacuum. In order to remove the amine as completely as possible it is advisable to set free all the amino groups in the reaction mixture by converting the aminohydrohalides into the free amines. This can be most easily accomplished with acid-binding agents such as sodium hydroxide, potassium hydroxide, calcium hydroxide, sodium carbonate or sodium alcoholate. For instance, an amount of concentrated aqueous sodium hydroxide solution equivalent to the halogen ion content can be added, then the water used for dissolving along with that formed in the reaction can be distilled and the excess polyamine removed by distillation, preferably with vacuum to take care of the reaction product. The recovered polyamine can be used again for a fresh batch. The sodium halide does not normally interfere in the further processing of the product or in its end use, so there is no need to eliminate it.

In the second stage of the process the polyether amine formed in the first stage is dissolved in water and reacted with a crosslinking agent. For crosslinking a wide variety of polyalkylating and polyacylating agents can be used, which by the formation of bonds between the polyetheramines increase the average molecular weight. Examples of crosslinking agents suitable for the present process are epichlorohydrin, 1,2 - dichlorethane, 1,2 - bis-(2'-chlorethoxy)-ethane, 1,4-dichloro-2,3-epoxybutane, N,N'-bischloracetylethylene diamine, diglycidylether, lower polyepichlorohydrin, chloracetyl chloride, cyanuric chloride, adipic acid chloride, divinyl sulfone, the compounds of formula

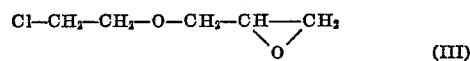

(III)

described in German Pat. 670,419, the compound of formula

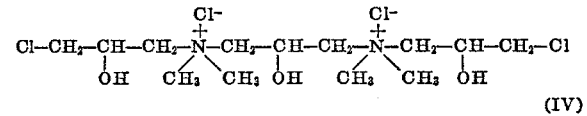

(IV)

described in Great Britain Pat. 1,213,745 and the other compounds disclosed in this patent.

The crosslinking reaction in the second stage of the process must be carried out in a controlled manner so that the final degree of crosslinking is neither too low nor too high. As the degree of crosslinking in aqueous solution increases, a point is reached at which a pronounced increase in the viscosity of the solution can be observed. The interval of time from this point to the point at which an insoluble gel is formed is fairly short. The crosslinking reaction must be terminated in this transitional phase in order to obtain final product conforming to the invention.

The reaction can be broken off in various ways. The quantitative ratio of the reactants (polyether amine from the first process stage and crosslinking agent) can be chosen so that the desired degree of crosslinking is reached when all the crosslinking agent has reacted. This method is described in the aforementioned Great Britain Pat. 1,213,745. Alternatively, an excess of the crosslinking agent can be used and the reaction stopped after the viscosity increase and before the formation of an insoluble gel by cooling and reducing the pH value by the addition of acid. Many different acids can be used for this purpose, including hydrochloric, sulphuric, lactic, tartaric, methanesufonic, benzenedisulfonic and phthalic acid. If this latter method is adopted, it can happen that the reactivity of the crosslinking agent, which may be one which reacts on one side only, is not completely frozen by lowering the pH to, say, 3–5. As a result, crosslinking will continue slowly during storage of the product till after some length of time it passes from the water soluble state into an insoluble gel. If final products which are storable almost indefinitely are desired, the first method must be employed to allow all reactive groups of the crosslinking agent to react, or failing this an excess of a crosslinking agent must be used which has so weakly reactive groups that its reactivity can be completely frozen by reducing the pH, in which case it is sufficient if one of two reactive groups of the crosslinking agent reacts slowly. Examples of such crosslinking agents are triglycol dichloride, [1,2-bis-(2'-chlorethoxy)-ethane] and the compound of Formula III above.

The concentration of the aqueous solution in which crosslinking is effected may vary within wide limits. It is advisable to work so that the concentration of active substance necessary for the intended end-use is present in the product immediately on completion of the process. These concentrations normally range from 10 to 50%, or more especially from 25 to 35%.

The present invention relates further to the use of the final products of the aforedescribed process. Like other high molecular, hydrophilic polyamines they are effective fluocculating and flotation agents for the treatment of effluents from urban communities and industrial plants, and are also good antistatic agents for textiles. A surprising feature is their high activity as drainage and retention aids in paper manufacture, in which they are superior to polyethylene imines although, as is known, these too are highly effective.

In the above specification and the following examples the part and percentages are by weight, and the abbreviation g. stands for grams, M.W. for molecular weight and E.W. for equivalent weight. The temperatures are in degrees centigrade. The molecular weights were determined by the vaporimetric method, cf. Chilewski and Simon, Helv. Chim. Acta 47, 515 (1964).

EXAMPLES OF THE PRODUCTION PROCESS

Example 1

92.5 g. (1 E.W.) of polyepichlorohydrin (average M.W. 1530) are dissolved in 240.0 g. (4 mols) of ethylene diamine at room temperature. The solution is raised to 100° under nitrogen gas with stirring. At this temperature an exothermic reaction sets in, so cooling is applied to keep the temperature below 140°. When the reaction is no longer exothermic, the mixture is stirred further for 2 hours at 100°. It is then cooled to about 30°, 133.3 g. (1 mol) of 30% sodium hydroxide solution are added, and the water and excess ethylene diamine distilled with vacuum. The mixture is then heated to 110–120° and stirred at 10–20 torr until weight constancy is reached, on which 162.8 g. of a residue are obtained which consists of 58.5 g. of finely crystalline sodium chloride and 104.3 g. of liquid polyether amine.

A solution of 9.4 g. of the residue in 10.6 g. of water is set with 1 g. of a 30% aqueous solution of the bis-chlorohydrin of Formula IV. The thinly liquid mixture is held for 18 hours at 65° to the end-point of the reaction. A viscous solution remains which contains 30% active substance and can be readily diluted with water to give homogeneous solutions of any desired strength.

The correct quantitative ratio of the two reactants, i.e. the residue from the first stage of the process and the bis-chlorohydrin of Formula IV, is determined by preliminary trials. If too little crosslinking agent of Formula IV is employed the viscosity of the reaction mixture does not appreciably increase after all the agent has reacted, while too much crosslinking agent leads to insoluble, gel-like products which cannot be diluted with water to form homogeneous solutions.

It may be found difficult to control the exothermic reaction in the first stage of the process when it is carried out on a plant scale, for which reason it is advisable to stir the ethylene diamine alone in water at 100–120° under nitrogen, adding the polyepichlorohydrin slowly so that this temperature is maintained, if necessary with the aid of external cooling. In this variant mode of operation of the process a greater excess of ethylene diamine is present through more or less the entire process than in the mode of operation described in the foregoing, where from the outset the total amounts of starting materials are present. As a result, an intermediate with a somewhat different degree of crosslinking is formed.

Other final products conforming to the invention can be obtained in analogy with the procedure of this example by replacing the crosslinking agent of Formula IV by others. As stated above, this agent is allowed to react quantitatively and the required amount of it is determined by preliminary trials. Water soluble crosslinking agants are added directly to the aqueous solution of the intermediate, or after prior dissolving in a solvent such as ethanol, acetone or chlorobenzene. If the ssytem is non-homogeneous it is best to stir the mixture vigorously throughout to ensure uniform progress of the reaction.

Example 2

92.5 g. (1 E.W.) of polyepichlorohydrin (average M.W. 1370) are dissolved in 412.0 g. (4 mols) of diethylene triamine at room temperature. After reaction and working up as described in Example 1, followed by heating to weight constancy, 199.0 g. of a residue are obtained which consists of 58.5 g. of sodium chloride and 140.5 g. of liquid polyetheramine.

A solution of 8.5 g. of the residue in 11.5 g. of water is mixed with 2.8 g. of a 30% aqueous solution of the bis-chlorohydrin of Formula IV. The thinly liquid mixture is held for 18 hours at 65° C. to the end-point of the reaction. A viscous solution is obtained which contains 30% active substance and is readily dilutable with water.

Example 3

The first stage of the process is carried out as in Example 2. In the second stage an excess of crosslinking agent is employed which is not completely reacted, and the reaction is carried out at a low pH to enable it to be suppressed and terminated at the right moment before the formation of an insoluble gel.

To a solution of 8.5 g. residue in 11.5 g. of water as given in Example 2 is added sufficient 30% hydrochloric acid to reduce the pH from the initial value, 11.6, to 7.6. Then 4.5 g. of a 30% aqueous solution of the bis-chlorohydrin of Formula IV are added and the mixture held for 16 hours at 65°. A viscous solution which can be diluted with water is obtained. It is of pH 6.8 and contains 30% active substance. It is stabilized by adjusting the pH to 5 with hydrochloric acid.

If the product is made alkyline with sodium hydroxide solution (about pH 9) and treated at 80–90°, it turns into a water insoluble gel after a short time.

After storage for 7 weeks at room temperature the product is unchanged; after one month at 50° it is an insoluble gel (in this time the pH decreases to 4.5).

Example 4

The reaction is carried out with an excess of crosslinking agent as in Example 3, but in order to obtain a product which is stable in storage the reactive groups which have not taken part in the crosslinking reaction are destroyed. 42.5 g. of the 199 g. residue obtained in Example 2 are dissolved in 137.5 g. of water, the solution is stirred at 30° and 16.6 g. of finely crystalline maleic anhydride are added. After 4 hours the clear solution is raised to 60°, on which the crosslinking reaction begins. After 20 minutes the thinly liquid solution turns very viscous. It is cooled to 30° and 17.6 g. of sodium hydrogen sulphite are added to destroy the reactive double bond in the maleic acid radicals. A viscous, storage stable solution is obtained which can be homogeneously diluted with water.

The course of this reaction is probably as follows. A proportion of the amino groups in the polyetheramine is first acylated to maleic semi-amides, then at 60° amino groups are added onto these at the double bond:

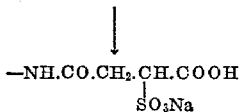

When the desired degree of crosslinking is reached the reaction is broken off by the addition of sodium hydrogen sulphite on the double bond in (V):

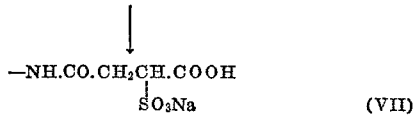

Example 5

9.25 g. (0.1 E.W.) of polyepichlorohydrin (M.W. 2090) are dissolved in 144.4 g. (1.4 mols) of diethylene triamide at room temperature and reacted as described in Example 2. After working up as in that Example 20.6 g. of residue are obtained, of which 5.8 g. are sodium chloride. As the starting polyepichlorohydrin is of high molecular weight, extensive crosslinking takes place in the first stage of the process. For crosslinking in the second stage, the product can be dissolved in 20 times the amount of water and reacted with 0.01 time the amount of triglycol dichloride at 85°.

Example 6

92.5 g. (1 E.W.) of polyepichlorohydrin (M.W. 520) are dissolved in 412.0 g. (4 mols) of diethylene triamine at room temperature and reacted and worked up as described in Example 2. A solution of 8.5 g. of the residue in 11.5 g. of water is prepared, 11.0 g. of a 30% aqueous solution of the bis-chlorohydrin of Formula IV are added and the mixture reacted to the end-point for 18 hours at 65°. The resulting viscous solution contains 30% active substance and is readily dilutable with water.

The excess amount of diethylene triamine used in this example can be reduced from 412.0 g. (4 mols) to 257.5 g. (2.5 mols). This means that substantially less crosslinking agent has to be used in the second stage of the process.

Example 7

92.5 g. (1 mol) of epichlorohydrin are dropped into 40.0 g. (0.1 mol) of polyethylene glycol (M.W. 400) containing 0.8 g. boric fluoride etherate in 40 minutes at 60–70°. The mixture is allowed to react for 20 hours at 90°. Subsequently the unreacted epichlorohydrin is distilled with vacuum. The dark brown residue left amounts to 109.3 g. of the reaction product, which means that only 69.3 g. (0.75 mol) of epichlorohydrin have reacted. The reaction product is dissolved in 309 g. (3 mols) of diethylene triamine at room temperature and the solution raised to 100° under nitrogen with stirring. At this temperature an exothermic reaction takes place; cooling is applied so that the temperature does not exceed 140°. When the reaction is no longer exothermic stirring is continued for 2 hours at 100°. After cooling to about 30°, 100.0 g. (0.75 mol) of 30% sodium hydroxide solution are added. Then the water and excess diethylene triamine are distilled with vacuum. The residue, 211.4 g. in all, consists of 167.6 g. of the organic reaction product and 43.8 g. of sodium chloride. 7.6 g. of the residue are added to 12.4 g. of water, 11.4 g. of a 30% aqueous solution of the bis-chlorohydrin of Formula IV are added and the mixture held at 65° for 18 hours to the end-point of the reaction. A viscous solution is obtained which contains 30% active substance and is dilutable with water.

Example 8

In 1 hour 139.0 g. (1.5 mols) of epichlorohydrin are dropped into 9.1 g. (0.05 mols) of sorbitol containing 1 g. of boric trifluoride etherate at 100–105°. The mixture is reacted for 2½ hours at 100–110°, then vacuum is applied to distil the unreacted epichlorohydrin.

The yield is 148.0 g., which shows that the epichlorohydrin has completely reacted. The reaction product is dissolved in 618 g. (6 mols) of diethylene triamine at room temperature and the solution heated to 100° in a current of nitrogen with stirring. At this temperature an exothermic reaction takes place, so cooling is applied to keep the temperature below 140°. When the reaction is no longer exothermic the mixture is stirred further for 2 hours at 100°. On cooling to about 30° 200 g. (1.5 mols) of 30% sodium hydroxide solution are added. The water and excess diethylene triamine are distilled with vacuum. The 310.0 g. of residue left consists of 222.3 g. of polyetheramine and 87.7 g. of sodium chloride.

A solution of 8.4 g. of the residue in 11.6 g. of water is prepared, 6.5 g. of a 30% aqueous solution of the bis-chlorohydrin of Formula IV are added and the mixture reacted for 18 hours at 65°. A viscous solution containing 30% active substance is obtained which is readily dilutable with water.

Example 9

139.0 g. (1.5 mols) of epichlorohydrin are added dropwise in 30 minutes at 80–90° to 75.0 g. (0.05 mols) of ethoxylated sorbitol (1 mol sorbitol: 30 mols ethylene oxide) containing 3 g. of boric trifluoride etherate. The mixture is reacted from 5 hours at 100°, after which the unreacted epichlorohydrin is distilled with vacuum. The reaction product is obtained in a yield of 182.2 g. which indicates that only 1.15 mols of epichlorohydrin have reacted. It is dissolved in 474 g. (4.6 mols) of diethylene triamine at room temperature, the solution is raised to 100° in a nitrogen current with stirring, and then cooling is applied to prevent the exothermic reaction leading to a temperature increase to above 140°. When the reaction is no longer exothermic stirring is continued for 2 hours at 100°. The reaction mixture is then cooled to about 30°, 153 g. (1.15 mols) of 30% sodium hydroxide solution are added and the water and excess diethylene triamine distilled with vacuum. The residue amounts to 336 g. made up of 67 g. of sodium chloride and 269 g. of polyetheramine.

A solution of 7.5 g. of the residue in 12.5 g. of water is set for reaction with 10.8 g. of a 30% aqueous solution of the bis-chlorohydrin of Formula IV. After 18 hours at 65° the end-point of the reaction is reached. The product is a viscous solution containing 30% active substance which is readily dilutable with water.

Example 10

A solution is prepared with 12.8 g. of the residue obtained as the product of the first process stage in Example 2 and 18.6 g. of water. After the addition of 0.6 g. of epichlorohydrin the mixture is reacted for 18 hours at 65° to the end-point. A viscous solution is obtained which contains 30% active substance and is readily dilutable with water.

Example 11

A reaction mixture is prepared with 12.8 g. of the residue formed as the product of the first stage of the process as in Example 2, 17.9 g. of water and 0.3 g. of 1,2 - bis - (2' - chlorethoxy)-ethane. The quantitative reaction is accomplished in 18 hours at 65°. It gives a viscous solution with a content of 30% active substance which is readily dilutable with water.

Example 12

The mixture for reaction is set with 12.8 g. of the residue obtained as the product of the first process stage in Example 2, 0.48 g. of N,N'-bis(chloracetyl)-ethylene diamine and 18.3 g. of water. After 18 hours at 65° reaction is complete. A viscous solution is obtained containing 30% active substance which is readily dilutable with water.

Example 13

12.8 g. of the residue obtained as the product of the first process stage in Example 2 are added to 17.7 g. of water, followed by 0.2 g. of the diaminotetraepoxide of Formula VIII described below. The mixture is reacted to the end-point in 18 hours at 65°. A viscous solution containing 30% active substance is obtained which is readily dilutable with water.

The diaminotetraepoxide used here as crosslinking agent has the constitution

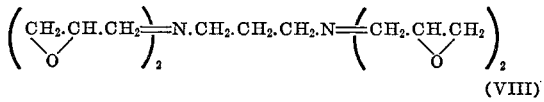

(VIII)

and can be produced as follows. A solution of 148 g. (2 mols) of 1,3-diaminopropane in 160 g. of methanol is added rapidly with stirring and ice-bath cooling to 925 g. (10 mols) of epichlorohydrin. The mixture is reacted for 5 hours at 25–30° (mild cooling). After vacuum distillation of the methanol and the excess epichlorohydrin at room temperature, the residue is dissolved in 800 ml. of dioxan. 890 g. (10 mols) of 45% sodium hydroxide solution is added dropwise in a short time at about 20° (ice-bath cooling). Stirring is continued for 30 minutes, then just enough water is added for the precipitated sodium chloride to go into solution, on which the aqueous is separated from the organic phase. The organic phase is dried over potassium carbonate and the solvent eliminated with vacuum, leaving as residue 514 g. of an oily product as clear as water, which conforms to Formula VIII and has an epoxyoxygen content of 18.5% (calculated content 21.5%).

EXAMPLES OF APPLICATION

Example A (Action as a drainage aid in paper manufacture)

The time required to separate a given volume of liquid from a suspension of paper stock of given composition containing a drainage aid, relative to the time for stock of the same composition without a drainage aid, is a measure of the drainage action of these auxiliaries. The test method used is described in specification V/7/61 of the "Verein der Zellstoff- und Papier-Chemiker- und Ingenieure."

The table below contains the comparative values for two drainage aids widely used in paper manufacture and the final product of Example 2 above. The figures in the second column give the number of grams active substance (exclusive of solvent) in the product as a percentage relative to 100 g. of the air-dry paper stock. The drainage times in seconds are given alongside.

| Paper stock | Concentration, percent | Polymine SN | Retaminol C | Product of Example 2 |
|---|---|---|---|---|
| A | 0 | 310 | 310 | 310 |
|   | 0.06 | 290 | 293 | 245 |
|   | 0.12 | 274 | 276 | 164 |
|   | 0.18 | 263 | 281 | 97 |
| B | 0 | 106 | 106 | 106 |
|   | 0.06 | 92 | 96 | 91 |
|   | 0.12 | 82 | 87 | 77 |
|   | 0.18 | 79 | 83 | 74 |
| C | 0 | 268 | 268 | 268 |
|   | 0.06 | 74 | 107 | 66 |
|   | 0.09 | 67 | 88 | 60 |
|   | 0.12 | 64 | 78 | 59 |

The consistency of the stock used for these tests, i.e. its solid content prior to sheet formation, was 0.25%. The three paper stocks were of the following composition:

(A) unbleached sulfite pulp, freeness value 65° S.R., adjusted to pH 4.8 with aluminum sulfate;
(B) bleached sulfite pulp, freeness value 35° S.R., adjusted to pH 4.8 with aluminum sulfate;
(C) 70% bleached mechanical woodpulp, 30% bleached sulfite pulp, with 15% of a commercial China clay, pH 7, freeness value prior to China clay addition 50° S.R.

Example B (Action as a retention aid in paper manufacture)

A given amount of a retention aid is added to a stock prepared from chemical pulp and filler shortly before sheet formation. Test sheets are dried, conditioned and burned to ash. The ash content is a measure of the retention of fibres and filler achieved with the auxiliary.

In the table the retention effect of two commercial products is compared with that of the product of Example 2. The second column gives the number of grams active substance (exclusive of solvent) of retention aid as a percentage relative to 100 g. of the air-dry paper stock, the other columns the percentage values for the ash content.

| Paper stock | Concentration, percent | Polymine SN | Retaminol C | Product of Example 2 |
|---|---|---|---|---|
| D | 0 | 8.1 | 8.1 | 8.1 |
|   | 0.03 | 11.9 | 8.3 | 13.5 |
|   | 0.06 | 13.1 | 8.5 | 14.2 |
|   | 0.12 | 14.2 | 10.8 | 14.3 |
| E | 0 | 10.0 | 10.0 | 10.0 |
|   | 0.03 | 12.1 | 11.8 | 12.7 |
|   | 0.06 | 13.1 | 12.6 | 13.7 |
|   | 0.09 | 13.5 | 12.9 | 13.9 |

The stock used for these tests was of 0.125% consistency, and of the following composition:

(D) 100 parts bleached sulfite pulp, 20 parts China clay (grade A) and 0.20 parts Leucophor BS, freeness value prior to additions 65° S.R., adjusted to pH 6.0 with sulfuric acid;
(E) 100 parts bleached sulfite pulp, 20 parts China clay (grade A) 2 parts rosin size and 3 parts aluminium sulfate, freeness value prior to additions 35° S.R., pH of stock 4.5.

Having such disclosed the invention what is claimed is:
1. A process for the production of a water-soluble, high molecular weight polyether amine which comprises
  (a) reacting (i) an aliphatic polyamine containing at least one primary or two secondary amino groups and having a molecular weight not greater than 200, with (ii) a polyepihalogenohydrin containing 3 to 25 halogenomethyl groups, at least two mols of the polyamine being employed per halogenomethyl group in the polyhalogenohydrin,
  (b) removing excess polyamine from the resulting reaction mixture by distillation, and (c) reacting an aqueous solution of the resulting polyether amine product with a cross-linking agent to a degree of cross-linking at which, while the polyether amine remains in solution, an increase in viscosity of the solution has occurred.

2. The process of claim 1 which includes, as step
(d) partially or completely converting free amino groups in the resulting polyether amine to acid addition salt forms by addition of acid.

3. A process according to claim 1, in which the polyamine used as component (i) in step (a) is selected from 1,2-diaminoethane, 1,2- and 1,3-diaminopropane, 1,2- and 1,4-diaminobutane, 1,6-diaminohexane, N-(2'-hydroxyethyl)-1,2-diaminoethane, 1,3-diamino-2-propanol, 3-dimethylaminopropylamine N,N'-bis-(2'' - hydroxyethyl)-1,2-diaminoethane, piperazine, N-(2-aminoethyl)-piperazine, diethylenetriamine, triethylenetetramine, tetraethylenepentamine, N,N-bis-(3-aminopropyl)-amine, N,N'-bis-2''-aminoethyl-1,4-diaminobutane and tri-(3-aminopropyl)-amine.

4. A process according to claim 3, in which the polyether amine is diethylene triamine.

5. A process according to claim 1 wherein step (a) is effected at 90° to 200° C.

6. A process according to claim 1, in which step (a) is continued for a period of time sufficient to allow reaction of substantially all the halomethyl groups present in the polyepihalogenohydrin employed as component (ii).

7. A process according to claim 1, wherein step (a) is carried out in the absence of an acid binding agent.

8. A process according to claim 1, in which the distillation in step (b) is carried out under vacuum.

9. A process according to claim 7, in which the reaction mixture resulting from step (a) is treated with an acid binding agent prior to step (b).

10. A process according to claim 1, in which the concentration of the aqueous solution in step (c) is from 10 to 50% by weight.

11. A process according to claim 10, in which the concentration is from 25 to 35% by weight.

12. A process according to claim 1, in which the cross-linking agent in step (c) is epichlorohydrin, 1,2-dichloroethane, 1,2-bis-(2'-chlorethoxy)-ethane, 1,4-dichloro-2,3-epoxybutane, N,N'-bis-(chloracetyl)-ethylenediamine, diglycidyl ether, low molecular weight polyepichlorohydrin, chloracetyl chloride, cyanuric chloride, adipic acid chloride divinyl sulphone, a compound of formula

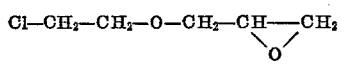

or a compound of formula

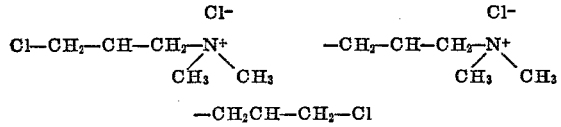

13. A process according to claim 1, which consists essentially of
(a) reacting the aliphatic polyamine with a polyepihalogenohydrin containing as main component a polyeher chain of the formula

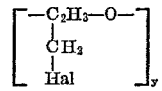

wherein
Hal is bromine or chlorine and
y is a number from 3 to 25 for a period of time sufficient to allow reaction of substantially all of the halomethylether groups in the polyepihalogenohydrin,
(b) distilling off excess polyamine, and
(c) reacting a 10 to 50% aqueous solution of the resulting polyether amine product with a cross-linking agent.

14. A process according to claim 13, which includes the additional step (d) of partially or completely converting free amino groups in the resulting polyether amine to acid addition salt forms by additions of acid.

15. A process according to claim 1, in which the cross-linking in step (c) is terminated at the desired point by reduction of the pH of the reaction mixture by addition of acid.

16. A process according to claim 1, in which the desired degree of cross-linking in step (c) is controlled by use of the appropriate quantity of cross-linking agent.

17. A process according to claim 2, in which the polyether amine resulting from step (c) is treated with an acid selected from hydrochloric, sulphuric, tartaric, lactic, methanesulphonic, benzene disulphonic, and phthalic.

18. A water-soluble, high molecular weight polyether amine obtainable by the process of claim 1.

19. A water-soluble, high molecular weight polyether amine obtainable by the process of claim 2.

References Cited
UNITED STATES PATENTS

| | | | |
|---|---|---|---|
| 3,248,353 | 4/1966 | Coscia | 162—164 |
| 3,144,380 | 8/1964 | Drehwen | 162—164 |
| 3,275,588 | 9/1966 | Garms | 260—2 BP |
| 2,601,597 | 6/1952 | Daniel et al. | 162—164 |
| 3,658,641 | 4/1972 | Shen | 162—164 |
| 3,158,580 | 11/1964 | Vandenberg | 260—2 A |
| 3,058,873 | 10/1962 | Keim et al. | 162—164 |

FOREIGN PATENTS 709,885    5/1965    Canada _____ 260—2 BP

S. LEON BASHORE, Primary Examiner

K. M. SCHOR, Assistant Examiner

U.S. Cl. X.R.

162—164; 260—29.2 EP